Nov. 4, 1969 W. SCHLÜTER 3,476,001
APPARATUS FOR CONTROLLING A TOOL CARRIAGE MOVING
IN SYNCHRONISM WITH A TRAVELLING BAND MATERIAL
Filed Nov. 7, 1967 3 Sheets-Sheet 1

INVENTOR
Walter SCHLÜTER
By

*Lowry & Rinehart* his ATTORNEYS

Nov. 4, 1969    W. SCHLÜTER    3,476,001
APPARATUS FOR CONTROLLING A TOOL CARRIAGE MOVING
IN SYNCHRONISM WITH A TRAVELLING BAND MATERIAL
Filed Nov. 7, 1967    3 Sheets-Sheet 2

INVENTOR
Walter SCHLÜTER
By his ATTORNEYS

United States Patent Office 3,476,001
Patented Nov. 4, 1969

3,476,001
APPARATUS FOR CONTROLLING A TOOL CARRIAGE MOVING IN SYNCHRONISM WITH A TRAVELLING BAND MATERIAL
Walter Schlüter, Geesthacht, Germany, assignor to Wilhelmsburger Maschinenfabrik Hinrichs & Sohn, Geesthacht, Germany, a firm
Filed Nov. 7, 1967, Ser. No. 681,159
Claims priority, application Germany, July 6, 1967, W 44,319
Int. Cl. B26d 1/56, 5/20
U.S. Cl. 83—285                    14 Claims

ABSTRACT OF THE DISCLOSURE

An apparatus for controlling a tool carriage moving in synchronism with a continuously travelling band material, wherein the motion of the tool carriage is controlled by reference to the speed of revolution of the feed rollers propelling the band, is provided with a driven element for imparting the required motion to a tool carriage. The driving element is driven by two transmissions which are coupled by a differential arranged in a differential case. Each transmission has an input clutch and the two input clutches are engaged to drive the differential case. This differential case is geared to said driving element, alternately through one of said transmissions.

BACKGROUND OF THE INVENTION

This invention relates to apparatus for controlling a tool carriage moving in synchronism with a continuously travelling band material, wherein the motion of the tool carriage is controlled by reference to the speed of the feed rollers propelling the band.

For equipment such as a flying shear or a punch which is intended to perform working operations at prescribed intervals on a continuously travelling band it has already been proposed to control the motion of the working tool by reference to the speed of the roller propelling the band for the purpose of synchronising the speed of the tool with the speed of the band.

These synchronising control means which control the tool carriage by mechanical, hydraulic or electrical means are of complicated construction in order to perform the working operations at very precise intervals on the band. Many of them are unsuitable for performing operations on travelling bands which lack sufficient rigidity. This applies whenever the operation of the control equipment depends upon the band operating a stop, since the resultant deflection of the band is then responsible for variations in the lengths of travel between consecutive working operations.

Equipment for synchronising a working tool and a travelling band with greater precision, such as hydraulic or electronic equipment, is of such complicated design that its functional reliability is impaired. Moreover, such equipment requires highly skilled and experienced personnel, for instance for resetting the control means to working intervals of different lengths and generally for adjusting the equipment to a particular length.

SUMMARY OF THE INVENTION

It is therefore an object of the present invention to provide an apparatus for controlling the motion of a tool carriage in synchronism with a travelling band, which is of particularly simple construction, cheap to produce and easy to operate. Moreover, the contemplated apparatus is to be so designed that the intervals on the band at which the required operations take place can be very precisely maintained by a fully mechanical system containing no infinitely variable transmission member which might introduce inaccuracy by unavoidable slippage.

It is an other object of the invention to provide apparatus adapted to be readily readjusted to different intervals of length at which the desired operations are to be performed without affecting precision, irrespectively of the flexibility of the band. Moreover, interruptions in the feeding or speed of the band whilst the desired operations are being performed are not to occur.

According to the present invention the contemplated objects are attained by the provision, for imparting the required motion to the tool carriage, of a driving element driven by two transmissions which are coupled by a differential, each transmission having an input clutch and the two input clutches being engageable to drive the differential case, which is geared to said driving element, alternately through one of said transmission.

To this end the two transmissions are preferably alternately operatively connectable by their respective input clutches to a feed roller, one of the clutches being engaged or disengaged whilst the other clutch is still in engagement.

In virtue of this arrangement the required feed motion is imparted to the tool carriage first through one of the transmissions and then through the other, the carriage being accelerated to the speed of the travelling band and the working tool activated when this is the case. The return of the carriage is effected by supplementary means such as a restoring spring, whereupon the other transmission is activated for a fresh working cycle. Whilst one of these transmissions is in operation an idle motion corresponding to the desired length of feed of the travelling band is stored in the other transmission before the carriage is started again. In other words, in the course of each activation of one of the transmissions this transmission first runs idle until the required length of the band has run through the feed rollers before transmitting motion to the carriage, whilst the other transmission which is activated for the next working cycle stores an idle motion corresponding to the same length of feed of the band.

In this working cycle the two clutches are engaged in overlapping sequence. This means that one of the clutches is not engaged unless the other clutch is still engaged and similarly a clutch is not disengaged unless the other clutch is still engaged. This is an arrangement of considerable utility because both clutches must rotate at equal speeds when one of the clutches is engaged. This eliminates slippage which in slip clutches is resonsible for inaccuracies in the lengths of travelling band that intervene between two operations of the tool.

DESCRIPTION OF THE PREFERRED EMBODIMENT

Figure 1:
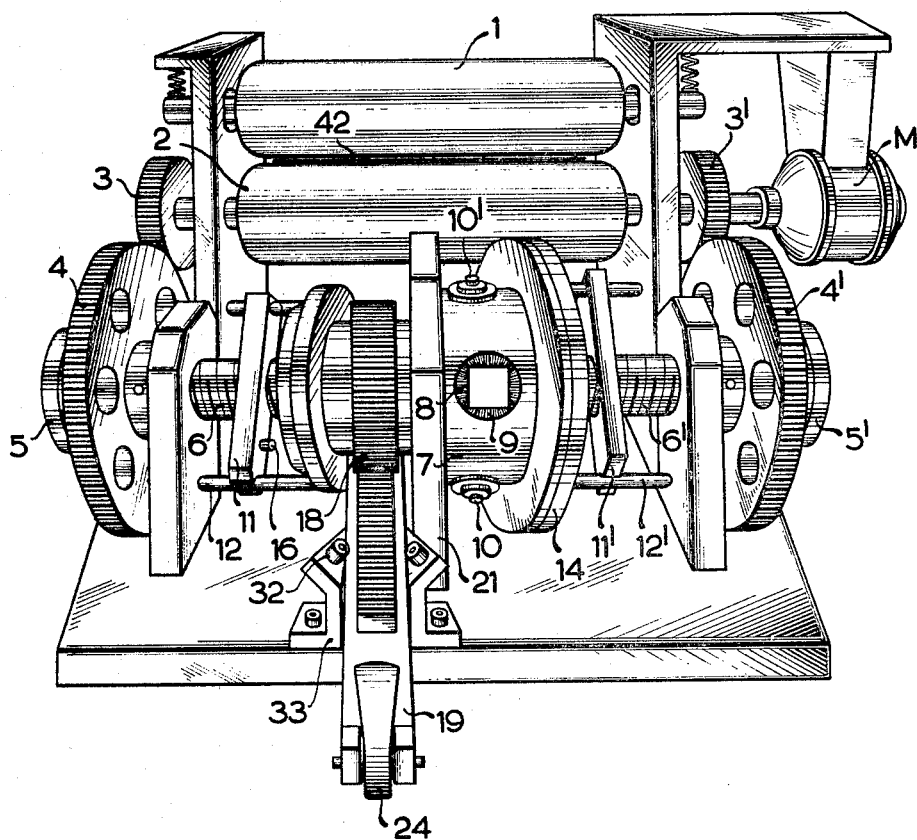
FIG. 1 is a front view of an embodiment of an apparatus according to the invention seen in perspective.

In the apparatus shown in the drawings a travelling band 42 of material which it is intended for instance to cut or punch at prescribed intervals of constant length is fed through the nip of two rollers 1 and 2 of which roller 1 is a pressure applying idling roller and roller 2 a live feed roller driven by a motor M. Each end of the shaft of the feed roller 2 carries a gearwheel 3 and 3' respectively, of which each is in mesh with a second gearwheel 4 and 4' respectively. The latter gearwheels each form one member of a clutch 5 and 5' respectively. The clutches 5 and 5' are presumed to be electromagnetically actuable. Alternatively some other, non-slip type of clutch, operable for instance by compressed air, may be provided. The clutch members which cooperate with the two gearwheels 4 and 4' are each fast on a shaft 6 and 6' respectively. These shafts 6 and 6' are screw shafts, shaft 6 having a right-hand thread and shaft 6' having a left-hand thread. The two screw shafts 6 and 6' upon which the two gearwheels 4 and 4' are loosely mounted are operatively coupled by a differential 7 in a case 7'. Inside the differential case 7' each screw shaft 6 and 6' carries a bevel wheel 8 and 8' respectively which both mesh with bevel pinions 9 and 9' rotatably mounted on cross shafts 10 and 10' in the differential case 7'.

Figure 2:
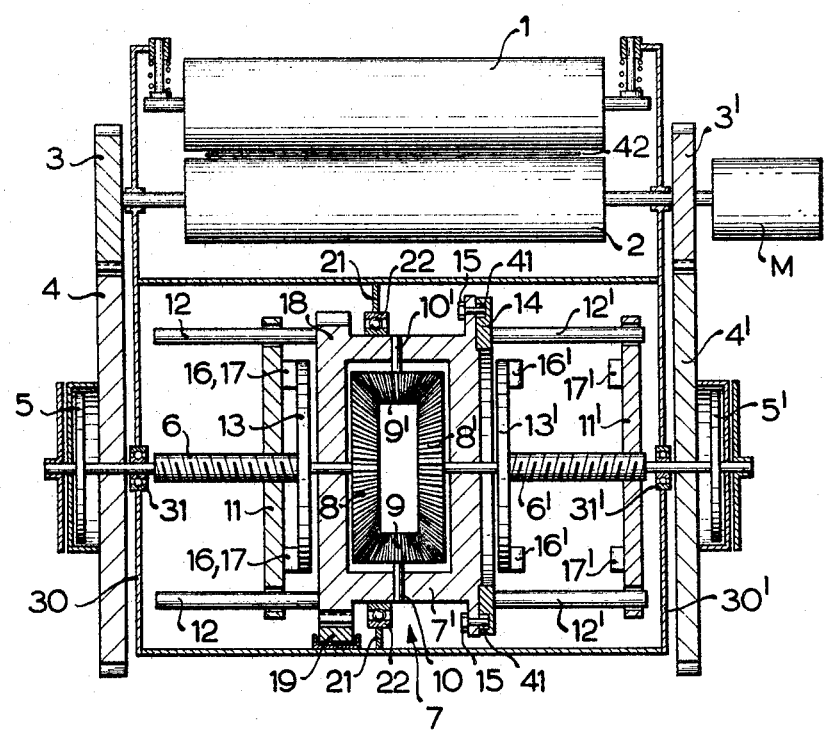
FIG. 2 is a part sectional front elevation.

Each screw shaft 6 and 6' carries a travelling nut 11 and 11' respectively. The nuts 11 and 11' each have the form of a two-armed lever adapted to ride in the threads of the screw shafts 6 and 6'. In the position illustrated in FIG. 2 the nut 11' is at the extreme right hand end of the screw shaft 6' and is adapted from this position to travel inwards to the left, whilst at the same time the nut 11 on the inner end of the left-hand screw shaft 6 travels from the right to the left outwards.

The ends of the arms of the two nuts 11 and 11' have transverse bores for the slidable reception in each nut of a pair of driving rods 12 and 12'. These rods 12 and 12' are rigidly connected at one end to the case 7' of the differential 7 and rotate together with the case 7' when the cross shafts 10 and 10' of the pinions rotate about the differential axis.

On the right-hand side the connection between the drivers 12 and the differential case 7' is rotatably adjustable and locatable at any desired angle, and the axial distance between the two nuts 11 and 11' can thus be adjustably varied. Moreover, a coupling disc 13' is fast on the screw shaft 6'. This coupling disc is embraced by a ring 14 which is secured to the case 7' of the differential 7 by screws 15, the screw heads being contained in an annular slot 41 in the ring 14. After slackening off the screws 15 the ring 14 and the drivers 12' which are affixed thereto can be rotated, causing the travelling nut 11' to rotate on the screw shaft 6' and to be axially displaced therealong in a direction depending upon the hand of rotation of the ring to decrease or increase the distance between the two nuts 11 and 11', the drivers 12' sliding in the bores in the arms of the nut during this axial displacement.

The coupling discs 13 and 13' which are fast on the screw shafts 6 and 6' each carry a dog tooth 16 and 16' respectively for co-operation with a corresponding tooth 17 and 17' on the facing sides of the nuts 11 and 11' respectively.

Between the two coupling discs 13 and 13' the case 7' of the differential 7 carries a gearwheel 18 which is affixed to the case 7' and which rotates together therewith. This gearwheel 18 meshes with a rack 19 which propels the carriage 20 mounting the tool which is to perform the desired operation on the travelling band of material. The tool mounted on the carriage 20 may be for instance a plate shear for dividing the band into portions of equal length by cutting at exactly predetermined intervals. Neither the shear nor the band is shown in this drawing. Adjacent the gearwheel 18 is a fixed wall 21 for supporting the screw shafts 6 and 6' and the differential 7, the wall containing an annular ball bearing 22 in which the differential case 7' can rotate.

Figure 3:
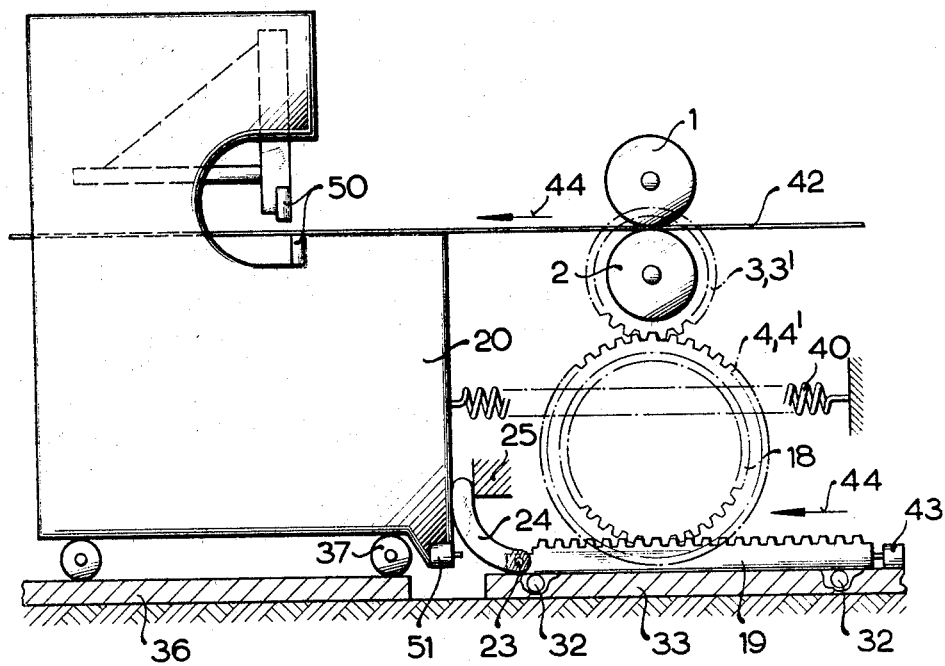
FIG. 3 is a side elevation of the apparatus.

As shown in FIG. 3 a stirrup-shaped member 24 is pivotably attached by a hinge pin 23 to the forward end of the rack 19. In starting position of the rack 19 the arched stirrup-shaped member 24 bears against an abutment face 25. When the rack 19 begins to advance the arched face of the stirrup-shaped member first slides on the rear wall of the carriage 20 until the full axial thrust of the rack 19 is transmitted to the tool carriage 20. This arrangement ensures a gentler acceleration of the tool carriage 20 from its stationary position to the feeding speed of the rack 19. The rack 19 is guided on a number of idling rollers 32 in a roller bed 33 which keep the rack 19 in elevational and lateral alignment. The carriage 20 is mounted on rollers 37 which run on a rail 36.

The described mechanism is mounted between side walls 30 and 30' provided with bearings 31 and 31' for the screw shafts 6 and 6'.

For returning the carriage at the end of its feed motion imparted thereto by the rack 19 a tension spring 40 is attached to the rear wall of the carriage 20. Alternative means for returning the tool carriage could be provided instead of a spring, such as a pneumatic or hydraulic actuator cylinder.

The described apparatus functions as follows:

When drive is imparted to the feed roller 2 the gearwheels 3, 3' and 4, 4' also rotate. Assuming that the carriage is in starting position the clutch 5' will first be engaged, whereas the other clutch 5 remains disengaged. Consequently rotation will be imparted to the screw shaft 6', causing the nut 11' to travel from the position shown in FIGURE 2 to the left, but the differential case 7' together with the driving rods 12 and 12', the gearwheel 18 and the rack 19 remain stationary. The axial displacement of the nut 11' along the screw shaft 6' continues until the dog tooth 17' strikes the dog tooth 16' on the coupling plate 13'. Whilst the nut 11' travels along the screw shaft 6', the other screw shaft 6 likewise rotates, but in the opposite hand of rotation to the screw shaft 6', because the differential 7 operates to reverse the hand of rotation from screw shaft 6' to screw shaft 6. When the dog tooth 17' strikes the dog tooth 16' the rotating coupling disc 13' which is fast on the rotating screw shaft 6' entrains the nut 11' which therefore likewise begins to rotate with the simultaneous cessation of further axial travel.

Whilst the nut 11' had been displaced from right to left the other nut 11 had been travelling, likewise from right to left, on the other screw shaft 6. The distance between the two nuts 11 and 11' therefore remains unchanged. As soon as the two dog teeth 16' and 17' engage, the resultant entrainment of the nut 11' by the coupling plate 13' which is fast on the shaft 6' causes the nut 11' to impart rotation to the case 7' of the differential by the two driving rods 12'. Hence the gearwheel 18 and the driving rods 12 likewise begin to rotate, nut 11 being entrained on the screw shaft 6 and thus similarly ceasing to travel further to the left. The two shafts 6 and 6' and the differential case 7' are thus locked and rotate as a solid unit at the same speed and in the same direction. At this instant the other magnetic clutch 5 is also engaged. This is effected by a switch 43 at the end of the rack 19, the switch being operated as soon as the rack 19 begins to be pushed forwards from its position of rest in the direction of the arrow 44 by the drive through the gearwheel 18. The forward movement of the rack 19 from its position of rest and the engagement of the magnetic clutch 5 initiates the feed movement of the carriage 20.

When the rack 19 begins to move forward the stirrup-shaped member 24 bearing against the abutment face 25 first tiltably slides on the rear wall of the carriage 20 until the latter has been accelerated from its position of rest to the speed of the rack 19, when the further transmission of axial thrust to the carriage 20 by the rack 19 will continue to move the carriage at the same speed as the rack. As soon as the speed of the carriage equals that of the rack 19 the tool 50 on the carriage 20 can start operating. This may be initiated for instance by the rack 19 tripping a switch 51 on the carriage 20. Assuming that the carriage carries a plate shear 50, the shear can be activated. However, the tool might equally well be a punch. The working tool 50 controls the clutch 5' by operating a switch not specially shown in the drawing. Upon completion of the required operation by the tool the latter therefore generates a signal or opens a switch for disengaging the magnetic clutch 5'. Hence the restoring pull of the spring 40 on the carriage 20 applies a return thrust to the rack 19 which the disengaged clutch 5' does not resist. Hence the rack 19 is returned, rotating the case 7' in the reverse direction and thereby causing the nut 11' to travel back to the right with the consequent disengagement of the two dog teeth 16' and 17'. At the same time the screw shaft 6 is rotated in forward direction because the clutch 5 is still in engagement. The dog tooth 17 on the nut 11 thus approaches and finally engages the dog tooth 16 on the coupling plate 13 which revolves together with the shaft 6. After the rack 19 has been restored to its starting position the clutch 5' is still disengaged. When the two teeth 16 and 17 engage the clutch 5 initiates the fresh advance of the rack 19 by the cooperation of parts 6, 16, 17, 11, 12, 18 and 7'. The same sequence of events to that already described is therefore repeated until the other clutch 5' is reengaged. This occurs when the teeth 16 and 17 come into engagement and the rack 19 begins to be moved out of its starting position, operating the switch 43 which causes reengagement of the magnetic clutch 5'. Conversely, the clutch 5 is again disengaged when the working tool has completed another operation, as above described.

In other words, the rack 19 is pulled back by the spring 40 in virtue of that clutch being disengaged which had previously caused the dog teeth 16 and 17 to be moved into engagement.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for controlling a tool carriage moving in synchronism with a continuously travelling band material, wherein the motion of the tool carriage is controlled by reference to the speed of revolution of the feed rollers propelling the band, comprising a driving element for imparting the required motion to a tool carriage, said driving element being driven by two transmissions which are coupled by a differential arranged in a differential case, each transmission having an input clutch and the two input clutches being engaged to drive the differential case, which is geared to said driving element, alternately through one of said transmissions.

2. Apparatus according to claim 1, wherein the two transmissions are alternately operatively connectable by their respective input clutches to a feed roller, one of the clutches being engaged or disengaged whilst the other clutch is still engaged.

3. Apparatus according to claim 1, wherein the two transmissions each comprise a screw shaft having threads of opposite hand to the other, and that said two shafts carry entraining means which are alternately operatively connectable to the differential case.

4. Apparatus according to claim 3, wherein each of the screw shafts carries a travelling nut for cooperation with said entraining means, said nuts being connected to the differential case for common rotation therewith but axially displaceable in relation thereto.

5. Apparatus according to claim 4, wherein the axially displaceable travelling nuts are provided with one or more abutments for cooperation with abutments that are fast on the screw shafts.

6. Apparatus according to claim 4, wherein the axially displaceable travelling nuts are guided on the screw shafts by driving rods affixed to the differential case and thereby rotatably coupled to said case.

7. Apparatus according to claim 4, wherein the relative spacing of the two axially displaceable travelling nuts is adjustable.

8. Apparatus according to claim 6, wherein the driving rods of the axially displaceable travelling nuts are affixed to a ring which is rotatably adjustably affixable to the differential case.

9. Apparatus according to claim 1, wherein the driving element of the tool carriage is a rack geared to the differential case.

10. Apparatus according to claim 9, wherein the rack is associated with restoring means including tension springs, which operate to restore the rack to its starting position when one of the two clutches is disengaged.

11. Apparatus according to claim 9, wherein the rack is provided at its forward end with a pivotally mounted stirrup-like member which bears against an abutment face and tiltably slides on the rear face of the tool carriage when the forward motion of the rack is initiated.

12. Apparatus according to claim 10, wherein a switch is provided behind the driving element, which switch operates to alternately engage the disengaged clutches when the driving element begins its forward motion.

13. Apparatus according to claim 1, wherein a switch is associated with a working tool, which switch is adapted in alternation to disengage one of the cltuches when the working tool has accomplished its operation.

14. Apparatus according to claim 13, wherein the tool carriage is provided with a switch for activating the working tool, said switch being operable by the driving element of the tool carriage.

References Cited
UNITED STATES PATENTS
3,125,918   3/1964   Small _____ 83—318 X

FOREIGN PATENTS
885,727   9/1943   France.
1,312,493   11/1962   France.
813,793   9/1951   Germany.
1,165,969   3/1964   Germany.

WILLIAM S. LAWSON, Primary Examiner

U.S. Cl. X.R.
83—314, 320